(12) United States Patent
Beno et al.

(10) Patent No.: US 6,698,981 B1
(45) Date of Patent: Mar. 2, 2004

(54) DRILL BIT WITH THREE CUTTING EDGES

(75) Inventors: Tomas Beno, Trollhättan (SE); Curt Muhrén, Trollhättan (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 10/030,819
(22) PCT Filed: Jul. 11, 2000
(86) PCT No.: PCT/SE00/01477
§ 371 (c)(1),
(2), (4) Date: Jun. 5, 2002
(87) PCT Pub. No.: WO01/07189
PCT Pub. Date: Feb. 1, 2001

(30) Foreign Application Priority Data

Jul. 14, 1999 (SE) .............................................. 9902696

(51) Int. Cl.$^7$ ................................................ B23B 51/06
(52) U.S. Cl. ......................................... 408/59; 408/227
(58) Field of Search .......................... 408/59, 223, 224, 408/227, 229, 230

(56) References Cited

U.S. PATENT DOCUMENTS

| | | | |
|---|---|---|---|
| 2,898,786 A | * 8/1959 | Willingham | ................. 408/59 |
| 4,594,034 A | * 6/1986 | Maier | ......................... 408/230 |
| 4,826,364 A | 5/1989 | Grunsky | |
| 5,173,014 A | * 12/1992 | Agapiou et al. | ............... 408/59 |
| 5,174,691 A | * 12/1992 | Shepley | ........................ 408/59 |
| 5,569,035 A | 10/1996 | Balfour et al. | |
| 5,851,094 A | 12/1998 | Strand et al. | |

FOREIGN PATENT DOCUMENTS

EP 0330107 * 8/1989 ................. 408/230

* cited by examiner

Primary Examiner—Daniel W. Howell
(74) Attorney, Agent, or Firm—Burns, Doane, Swecker & Mathis, LLP

(57) ABSTRACT

A drill has first, second and third teeth each tooth having a cutting edge at its front end. The cutting edge of the first tooth extends all the way to a center axis of the drill; the cutting edges of the second and third teeth have inner ends spaced from the axis to form a space between one another. A cooling channel extends axially through the drill until approaching the front end of the drill whereupon it becomes inclined relative to the axis and forms an exit port in the space.

8 Claims, 2 Drawing Sheets

DRILL BIT WITH THREE CUTTING EDGES

DESCRIPTION AND TECHNICAL AREA OF THE INVENTION

The present invention relates to a drill unit with a drill bit having a cooling channel, and with a device for supplying cooling fluid to the cooling channel of the drill.

BACKGROUND OF THE INVENTION

The engineering industry has at all times aimed at productivity increases and quality improvements. For accomplishing this at hole cutting operations, which constitute one of the most difficult operations within the engineering industry, one usually aims at increasing the cutting speed of the drill in order to in this way obtain a higher productivity. A higher cutting speed also gives a more finished surface, since the burr formation decreases. A problem with increased cutting speed, in particular when drilling in metal, is however, that a strong wear of the corners of the drill is obtained, due to the high temperature coming up at the machining. For decreasing the wear, cooling liquid is supplied, recently by means of cooling channels shaped in the drill. An example of such a drill is shown in U.S. Pat. No. 5,173,014, which describes a drill with two complete teeth, two peripherally working teeth and two cooling channels. By using a number of teeth, a more advantageous power distribution of the drill is obtained, which increases the precision of the drill. U.S. Pat. No. 5,174,691 shows a long drill with a central cooling channel, which is completed with two openings. For enabling a good chip transport at long drilled holes, the cooling liquid is supplied under a pressure of about 5500 kPa.

It has also been shown to be difficult achieving holes with required tight tolerances using conventional drilling, and the feeding of the drill must often be restricted due to the fact that high axial forces are required. An available method providing good tolerances and requiring low axial force is gun drilling. However, in this method a good control of the drill is required and small feedings, which gives a low manufacturing rate. These requirements lead to the result that it is often not possible to use this method, but rather traditional drilling is used with after-treatment with a broach. Moreover, in many cases the holes must be reamed.

The present invention relates to achieving a drill unit, which is not afflicted with the drawbacks mentioned above, and which admits a high productivity without renouncing the quality of the holes and with a long lifetime of the drill.

SUMMARY OF THE INVENTION

The purpose of the invention is obtained by means of a drill unit with a drill having a cooling channel, and with a device for supplying cooling fluid to the cooling channel of the drill, characterized in that the drill comprises three teeth, of which the first tooth extends from the periphery of the drill to its center, while the second and the third teeth extend inward from the periphery of the drill without reaching its center, that the cooling channel extends axially in the center of the drill and is deflected in the bit point of the drill so that it emerges in the space between the center and the terminal points of the second and the third teeth, as well as the supply arrangement for the cooling fluid is applied for supplying the fluid under high pressure. By shaping the drill with three teeth, a high productivity is enabled with tight tolerances of the drilled holes at the same time as only a small axial feeding power is required, as only one of the teeth works in the center of the hole. By means of supplying the cooling medium under high pressure a more effective cooling is obtained, which leads to a small wear of the drill and a lesser risk for structural changes in the machined material. At the same time the chip transport is facilitated providing a decreased risk for chip stopping, tool breakdown and damage to the hole surfaces. As the cooling channel extends substantially in the center of the drill, a maximum rigidity of the drill is obtained.

In a preferred embodiment the pressure of the cooling fluid supplied is larger than 3000 kPa and the teeth are unequally distributed around the circumference of the drill, whereby the angle, seen a circumferential way between the first tooth and the second and the third teeth, respectively, are 110° and 200°, respectively. Further, partially conical slots are shaped in the drill core between the three teeth, which slots extend toward the center of the drill. The partially conical slots are preferably shaped using a tool consisting of a conical grinding tool, the generatrix of which at the machining of the drill core forms an angle of at least 30° to the drill axis.

A most significant difference resulting from having only one tooth extending to the center of rotation relative to the situation when two teeth are allowed to extend to the center is that the drill contains no chisel edge and its negative cutting geometry which rather ploughs than cuts. Due to the fact that no chisel edge exists, the power picture is changed so that weaker workpieces deflect less in the longitudinal direction of the hole, which leads to better tolerances.

For prior art drills having a large chisel edge. 20% of the drilling of the hole diameter (i.e., the center of the hole) requires 80% of the axial force. A small part of the axial force reduction can be recovered by using high cooling fluid pressures.

When the angle of clearance from a geometrical point of view cannot be made sufficiently large on prior art drills having two or several teeth extending to the center, it is evident from the geometry that this problem is considerably better solved having only one tooth extending to the center. This is done for eliminating the negative impact the angle of clearance has in the center.

According to our judgement the invention according to U.S. Pat. No. 5,173,014 has not solved the problem with a high feeding power in the axial way, which is the consequence with having a plurality of teeth extending to the center rather than having only one tooth extending to the center. Only one tooth extending to the center, makes it possible to obtain positive cutting angles at the center.

An additional aspect is that it is considerably more difficult to achieve four points to coincide on a circle than three points, the latter resulting in a better cylindricality of the complete hole due to a disadvantageous power picture, with differentiated angles and in the present case there is a possibility to reduce the reduce the risk for self-generated torsional oscillations. Further a drill with four teeth has a lesser chip space leading to increased chip problems.

BRIEF DESCRIPTION OF THE DRAWINGS

The invention will now be described with reference to the enclosed figures, in which.

DESCRIPTION OF EMBODIMENTS

Figure 1:
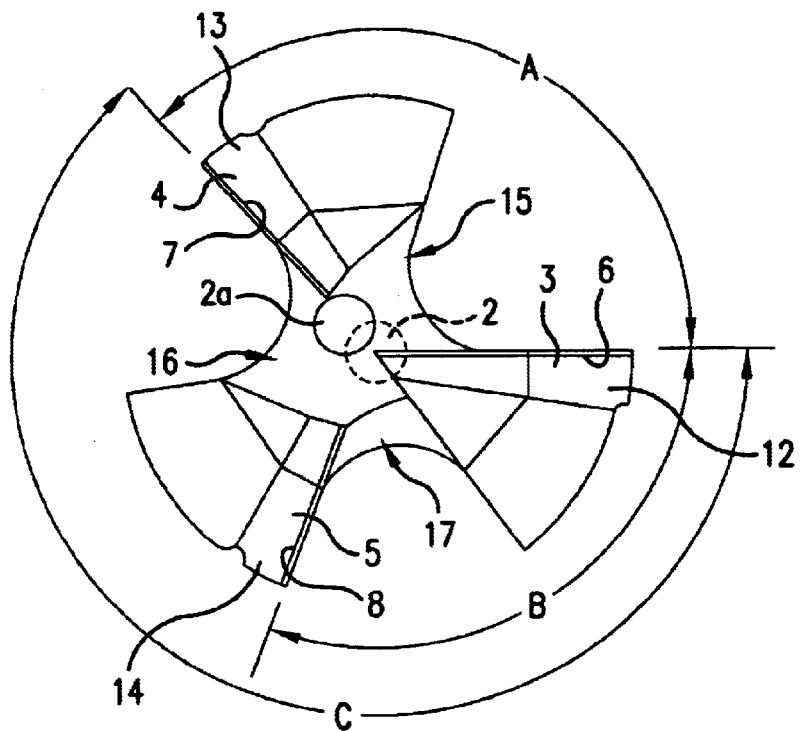
FIG. 1 shows a view of a gun drill from below in a preferred embodiment of a drill unit according to the invention.
Figure 2:
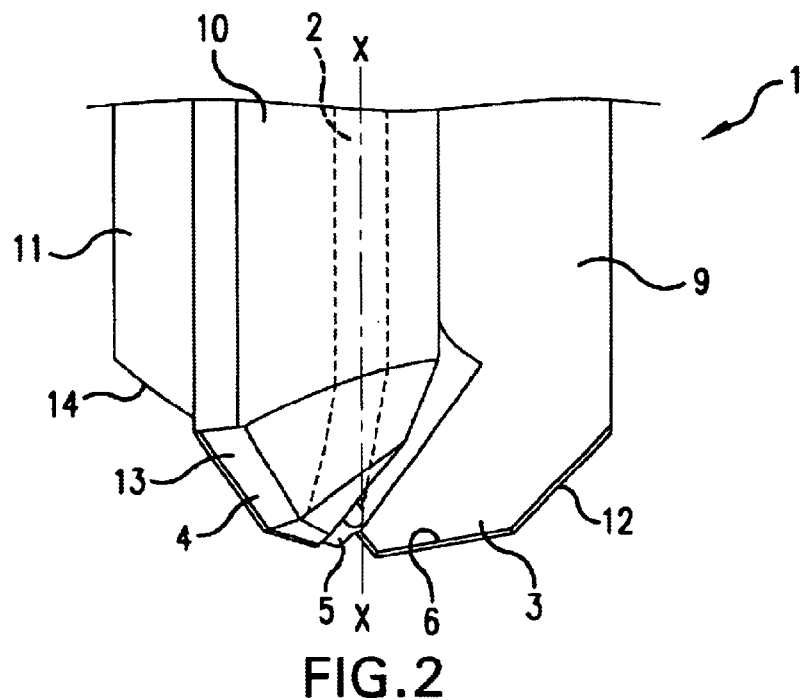
FIG. 2 shows a side-view of the bit point of the gun drill in FIG. 1.

In FIGS. 1 and 2 in a first preferred embodiment of the invention the lowermost part of a drill 1 is shown, which drill is connected to a drill unit not shown, which contains a device for supplying cooling liquid under high pressure to an axial substantially centrally running cooling channel 2 in the drill 1.

The drill 1 has three teeth 3, 4, 5 of which only the first tooth 3 extends from the periphery of the drill all the way to the center of the drill. The second and third teeth 4 and 5 end at a distance from the center, and their inner ends are located at the same distance from the center. The edges 6, 7 and 8, respectively, of the teeth 3, 4, 5 all extend radially from the periphery towards the center and the angles between the edges 6 and 7, 7 and 8, 8 and 6, respectively, are 140, 110 and 100°, respectively. The cuffing edges 6, 7, 8 extend acutely relative to the center axis X—X of the drill as viewed in a direction perpendicular to the axis (see FIG. 2). The edges 6, 7, 8, all have one internal part and one external part, whereby as shown in FIG. 2, the internal part closest to the center of the drill forms a large angle to the axis of the drill, while the external parts form a more acute angle. As previously mentioned only the tooth 3 has an edge 6 with an internal part extending all the way to the center of the drill. The teeth 4 and 5 will by means of this shaping work substantially peripherally.

As the teeth 4 and 5 do not extend to the center of the drill, these will less be effected by force than the tooth 3, implying that the teeth must be unequally distributed around the circumference of the drill, to obtain the desired power distribution at the drilling. Further the internal part of the tooth 3, which extends towards the center of the drill, provides different contributions to the total power depending on the material in the work piece. The angles A, B, C between the cutting edge of the tooth 3, and the cutting edges of the second and third teeth 4, 5 may therefore differ between, A=135°–145°; B=105°–150°(preferably 110°); and C=215°–225°(preferably 200°), respectively.

The teeth 3, 4 and 5 convert into spars 9, 10 and 11, respectively, which extend axially along the drill 1. The spars 9, 10, 11 are provided with margin strips 12, 13 and 14, respectively. Further the drill core at the bit point of the drill is provided with slots 15, 16, 17, which extend between the respective adjacent tooth from the periphery of the core to the center of the drill. These slots are achieved by a conical grinding body, whereby the same conical body is preferably used for achieving all slots. Thus the slots have the same form as a section of the envelope surface of said conical body. In the present description, this form is denoted "partial conical form". The cone angle of said conical grinding body is preferably larger than 60° and the conical body is preferably directed in such a way, at the machining of the drill core, that its generatrix forms an angle of at least 30° to the drill axis X—X. The conical body is also preferably used for ensuring that the interior edge parts of the teeth 4, 5 are spaced at the intended distance from the center of the drill.

The cooling channel 2 emerges at an exit orifice 2a in the space between the internal parts of the teeth 3 and 4, and thus, is inclined to the drill axis in the bit point of the drill (see FIG. 2). As a substantial portion of the cooling channel extends along the axis X—X of the drill, a maximum rigidity of the drill 1 is obtained.

As the tooth 3 extends to the center of the drill, the drill 1 has no chisel edge, whereby the so-called plough effect appearing at the chisel edge of conventional double cutting drills is eliminated, which to a high degree decreases the plastical deformation of the material machined at the end of the hole. Thereby it occurs that only a slight burring occurs at the end of the hole and a small protrusion of the machined material occurs at a drilling through (i.e., at reaching the end of the hole). Compared to drills with two teeth, which work in the center of the drill, a lesser feeding power of a drill according to the invention is required at the same feed per revolution. The peripherally working teeth 4, 5 enable a higher volume cutting to take place than if only one tooth has been used and enable a power balance to be achieved between the three teeth so that the drill has a steady center of rotation during the complete operation. Further the teeth 4, 5 contribute to the attainment of a good quality of the hole surfaces implying that no after-treatment of these is required in several cases after finished drilling. As the drill 1 works with a power balance and a good steering by means of the three margin strips, less vibration of the drill occur while operating, and the risk for eccentricity of the hole drilled is small. The risk for eccentricity by means of deflection of long drills decreases as well due to the fact that only a small axial feeding power is required when operating a drill according to the invention.

A pre-condition to be able to run the described drill in an effective way, i.e. with high velocity and feeding speed, is that the cooling medium is supplied under high pressure. For this purpose of the drilling machine, the drilling tool or the like, in which the drill 1 is supported, is provided with a device for supplying cooling medium under high pressure to the cooling channel 2. The device may for instance comprise a pump, e.g. a geardriven pump from PARKER, USA, which pumps cooling medium, e.g. a cutting fluid emulsion KFL 360 BIO from QUAKER, USA, from a tank. The pump should have a displacement of at least $K*D^2$, where K=0.15 l/min and D=drill diameter, and the pressure of the cooling medium should be at least 3000 kPa. The transition between the stationary line from the pump to the rotating cooling channel in the drill is provided by means of a swivel, preferably a swivel from WTO, Germany. Other components of a drilling machine, a drilling tool or the similar, comprising a drill unit according to the invention, are of a conventional type and do no need to be. closer described more in detail. It is pointed out that the drill 1 may be used in all types of drilling tools or the like provided with a high pressure equipment according to the invention. The shaping itself of the drilling tool in other respects, does not constitute a part of the invention and therefore does not need to be illustrated in the drawing.

In general, during the supplying of a cooling liquid a steam film is formed having the largest extension at the outer corners of the edges, which constitute the parts of the teeth running with the highest speed. This film insulates the edges from the surrounding cooling liquid and makes it more difficult to dispose the heat from there. By supplying the cooling liquid under high pressure, the thickness as well as the extension of the steam film are considerably decreased and the disposal of the heat is considerably facilitated. Thereby the temperature of the edges may be kept low leading to a decreased wear, which is especially noticeable at the outer corners, as well as a lesser risk for structural transformations in the machined material. The risk for the occurrence of building-ups by weldings, for instance at the margin strips 12, 13, 14, is considerably decreased. Besides cooling the drill, the cooling medium provides a good lubrication of the margin strips so that the friction between these strips and the hole surface becomes small.

Another important advantage from having a high pressure of the cooling medium is that the disposal of the chips from the bit point of the drill to the spaces between the spars 9, 10, 11 and along these spaces is clearly improved. Thereby the risks for chip stopping, tool breakdown and damage to the hole surfaces are substantially decreased.

Figure 3:
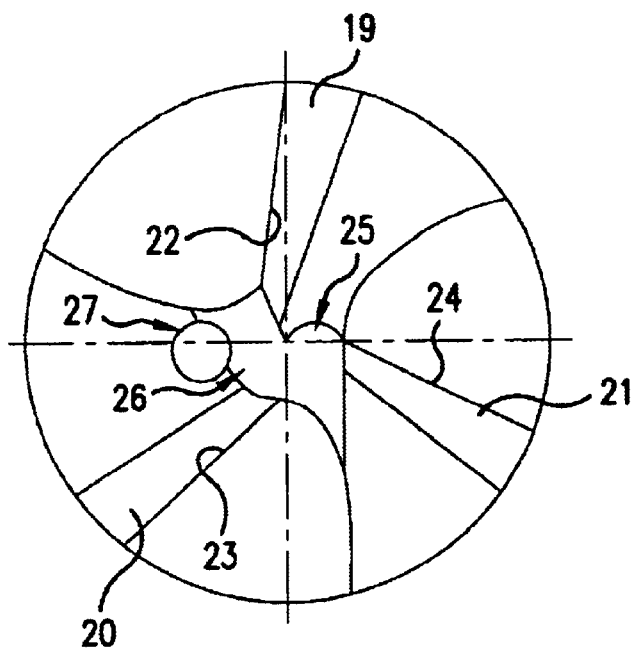
FIGS. 3 and 4 show the same views as FIGS. 1 and 2, respectively, of a half twist bit according to a second embodiment of the invention.
Figure 4:
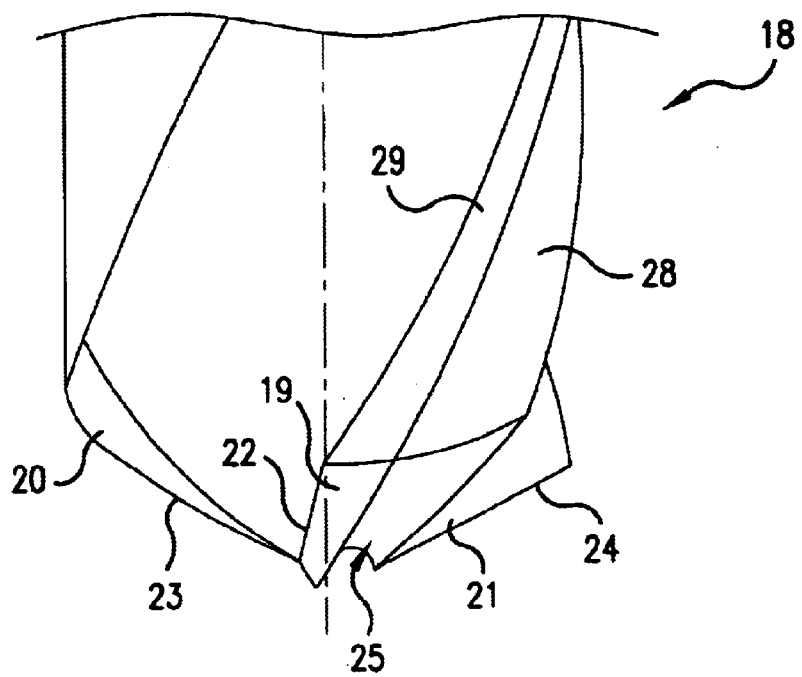

The FIGS. 3 and 4 show the same views, as the FIGS. 1 and 2, respectively, of a half twist bit 18 according to a second embodiment of the invention. Likewise, this drill has three teeth 19, 20, 21 with edges 22, 23, 24. Only the edge 22 of the tooth 19 works in the center of the drill and reaches up to this center. The edges 23, 24 of the teeth 20, 21 stop before the centre of the drill, and slots 25, 26 extend between the internal ends of these edges and the center of the drill. A cooling channel 27, which is riot shown in FIG. 4, extends centrally in the center of the drill core, and is, in the same way as in the drill of the first embodiment, deflected in the bit point of the drill, so that it emerges at the side of the center of the drill. The exit orifice of the cooling channel 27 is shown in FIG. 3. The teeth 19, 20, 21 transform into helical spars, of which the spar 28 of the tooth 19 is shown with its margin strip 29 in FIG. 4.

The edges of the drill 18 are, similarly to the drill 1, formed in such a way that a power balance occurs at drilling. The drill 18 shows the same advantages and good characteristics as the drill 1.

The material of the drills is preferably hard metal, but other materials such as high speed steel (HSS) may also be used. It is also possible that the shaft may be formed of a material different than the bit point of the drill.

The described drill unit may of course be modified within the scope of the invention, especially with respect to the geometrical shape of the edges.

What is claimed is:

1. A drill comprising a plurality of cutting teeth, a front end of each tooth including a cutting edge extending acutely relative to a longitudinal center axis of the drill as viewed in a direction perpendicular to the axis; only a first of the teeth extending to the axis, the remaining teeth including respective inner ends spaced from the axis and forming a space between one another; a cooling channel formed in the drill, the cooling channel including a front end portion inclined relative to the axis and forming an exit orifice situated in the space, and a substantial main portion of the cooling channel extending rearwardly from the front end portion being centered on said longitudinal center axis of the drill.

2. The drill according to claim 1 wherein the teeth are distributed unevenly around a circumference of the drill.

3. The drill according to claim 2 wherein the plurality of teeth consist of first, second, and third teeth, the first tooth constituting the tooth extending to the axis.

4. The drill according to claim 3 wherein the first tooth forms an angle with the second tooth in the range of 215°–225°, and an angle in the range of 105°–115° with the third tooth.

5. The drill according to claim 4 wherein the angle between the first and second teeth is substantially 200°, and the angle between the first and third teeth is substantially 110°.

6. The drill according to claim 2 further including a center core, a front end of the center core being of generally conical shape and forming slots between successively arranged ones of the teeth.

7. A drill assembly comprising a drill and a fluid-supply device supplying cooling fluid to the drill;

the drill comprising a plurality of cutting teeth, a front end of each tooth including a cutting edge extending acutely relative to a longitudinal center axis of the drill as viewed in a direction perpendicular to the axis; only a first of the teeth extending to the axis, the remaining teeth including respective inner ends spaced from the axis and forming a space between one another; a cooling channel formed in the drill, the cooling channel including a front end portion inclined relative to the axis to form an exit orifice situated in the space, and a substantial main portion of the cooling channel extending rearwardly from the front end portion being centered on said longitudinal center axis of the drill;

the fluid supply device supplying cooling fluid at a pressure greater than 3000 kPa to the cooling channel.

8. A drill comprising a plurality of cutting teeth consisting of first, second, and third teeth, a front end of each tooth including a cutting edge extending acutely relative to a longitudinal center axis of he drill as viewed in a direction perpendicular to the axis; only the first tooth extending to the axis, the second and third teeth including respective inner ends spaced from the axis and forming a space between one another; a cooling channel formed in the drill, the cooling channel including a front end portion inclined relative to the axis to form an exit orifice situated in the space; a substantial main portion of the cooling channel extending rearwardly from the front portion extending along and centered on the axis; the three teeth being distributed unevenly around a circumference of the drill; the first tooth forming an angle with the second tooth in the range of 215°–250°, and forming an angle with the third tooth in the range of 105°–115°; the drill including a center core, a front end of the center core being of generally conical shape and forming slots between successively arranged ones of the teeth.

* * * * *